United States Patent
Pallakoff et al.

(10) Patent No.: US 9,128,608 B2
(45) Date of Patent: Sep. 8, 2015

(54) SYSTEM AND METHOD FOR AN ELECTRONIC READER THAT ALLOWS ACCESS TO ADDITIONAL CONTENT AND TOOLS

(71) Applicant: barnesandnoble.com llc, New York, NY (US)

(72) Inventors: Matthew Pallakoff, Mountain View, CA (US); Luis Daniel Mosquera, Foster City, CA (US)

(73) Assignee: NOOK DIGITAL, LLC, New York, NY (US)

( * ) Notice: Subject to any disclaimer, the term of this patent is extended or adjusted under 35 U.S.C. 154(b) by 0 days.

(21) Appl. No.: 13/677,063

(22) Filed: Nov. 14, 2012

(65) Prior Publication Data

US 2013/0133081 A1 May 23, 2013

Related U.S. Application Data

(60) Provisional application No. 61/561,203, filed on Nov. 17, 2011.

(51) Int. Cl.
| | |
|---|---|
| G06F 21/00 | (2013.01) |
| H04L 29/06 | (2006.01) |
| G06F 3/0488 | (2013.01) |
| G06F 3/048 | (2013.01) |
| G06F 3/0483 | (2013.01) |
| G06F 21/44 | (2013.01) |
| H04N 5/445 | (2011.01) |
| G06F 3/01 | (2006.01) |
| G06F 17/24 | (2006.01) |
| G06F 17/30 | (2006.01) |

(52) U.S. Cl.
CPC ............ *G06F 3/04883* (2013.01); *G06F 3/048* (2013.01); *G06F 3/0483* (2013.01); *G06F 21/00* (2013.01); *G06F 3/011* (2013.01); *G06F 17/241* (2013.01); *G06F 17/30056* (2013.01); *G06F 17/30244* (2013.01)

(58) Field of Classification Search
CPC ......... G06F 3/048; G06F 21/00; G06F 3/011; G06F 3/048883; G06F 3/0483
USPC ............. 726/27; 709/217, 206, 204; 715/785, 715/277, 230, 863; 725/45
See application file for complete search history.

(56) References Cited

U.S. PATENT DOCUMENTS

| | | | | |
|---|---|---|---|---|
| 2011/0209100 A1* | 8/2011 | Hinckley et al. | ............... | 715/863 |
| 2012/0179753 A1* | 7/2012 | Welingkar et al. | ............ | 709/204 |
| 2012/0239758 A1* | 9/2012 | Dzmitrenka et al. | ......... | 709/206 |
| 2012/0284753 A1* | 11/2012 | Roberts et al. | .................. | 725/45 |
| 2013/0007612 A1* | 1/2013 | Kangas et al. | ................ | 715/277 |

FOREIGN PATENT DOCUMENTS

WO    WO 2013009954 A8 *  8/2013

OTHER PUBLICATIONS

Marshall, C.C. ; Bly, S. ; "Turning the pages on navigation"; Digital Libraries, 2005. JCDL '05. Proceedings of the 5th ACM/IEEE-CS Joint Conference on DOI: 10.1145/1065385.1065438; Publication Year: Jun. 2005; pp. 225-234.*

* cited by examiner

*Primary Examiner* — Andrew Nalven
*Assistant Examiner* — Courtney Fields
(74) *Attorney, Agent, or Firm* — Winston & Strawn LLP

(57) ABSTRACT

A method, system and non-transitory computer-readable medium are provided for controlling display of content on an electronic device with a touch screen display, which content may, in response to detection of a squeeze gesture, be reduced on the display screen to reveal additional content, tools and features associated with the one or more pages of the content.

17 Claims, 5 Drawing Sheets

SYSTEM AND METHOD FOR AN ELECTRONIC READER THAT ALLOWS ACCESS TO ADDITIONAL CONTENT AND TOOLS

FIELD OF THE INVENTION

The present invention generally relates to devices for reading digital content, and more particularly to systems and methods for improved navigation in an electronic publication.

BACKGROUND OF THE INVENTION

Electronic devices such as cellular phones, eReaders, and tablets are fast becoming necessities, especially for people on the move. Electronic devices can be used to place phone calls, to text messages, read electronic publications to browse the Internet, to take pictures and the like. The display area on a mobile electronic device can be limited due to its size, but the display area is usually adequate for viewing pictures or displaying text. Electronic devices typically include means for scrolling through text, such as pressing keys located on the device's keypad, a tracking wheel or other buttons located on the device.

The increasing popularity of touch screen devices with multitouch capabilities have alleviated, to some extent, the difficulties in navigating through digital publications. However the screen size of these mobile devices and the formatting of the electronic publications still presents a limitation on the ease with which one can navigate a digital publication. Improved systems and methods for navigating electronic documents using an electronic device would be desirable.

SUMMARY OF THE INVENTION

The present invention relates the user interface (UI) of an electronic reader. The invention allows the user to perform a multiple finger "squeeze" on the page of an electronic publication, thus shrinking its physical size on the screen. The reduced size page of the electronic publication reveals additional content or tools associated with the page or the electronic publication,

BRIEF DESCRIPTION OF THE DRAWINGS

For the purposes of illustrating the present invention, there is shown in the drawings a form which is presently preferred, it being understood, however, that the invention is not limited to the precise form shown by the drawings in which like reference characters refer to like parts throughout, and in which.

DETAILED DESCRIPTION OF THE INVENTION

Figure 1:
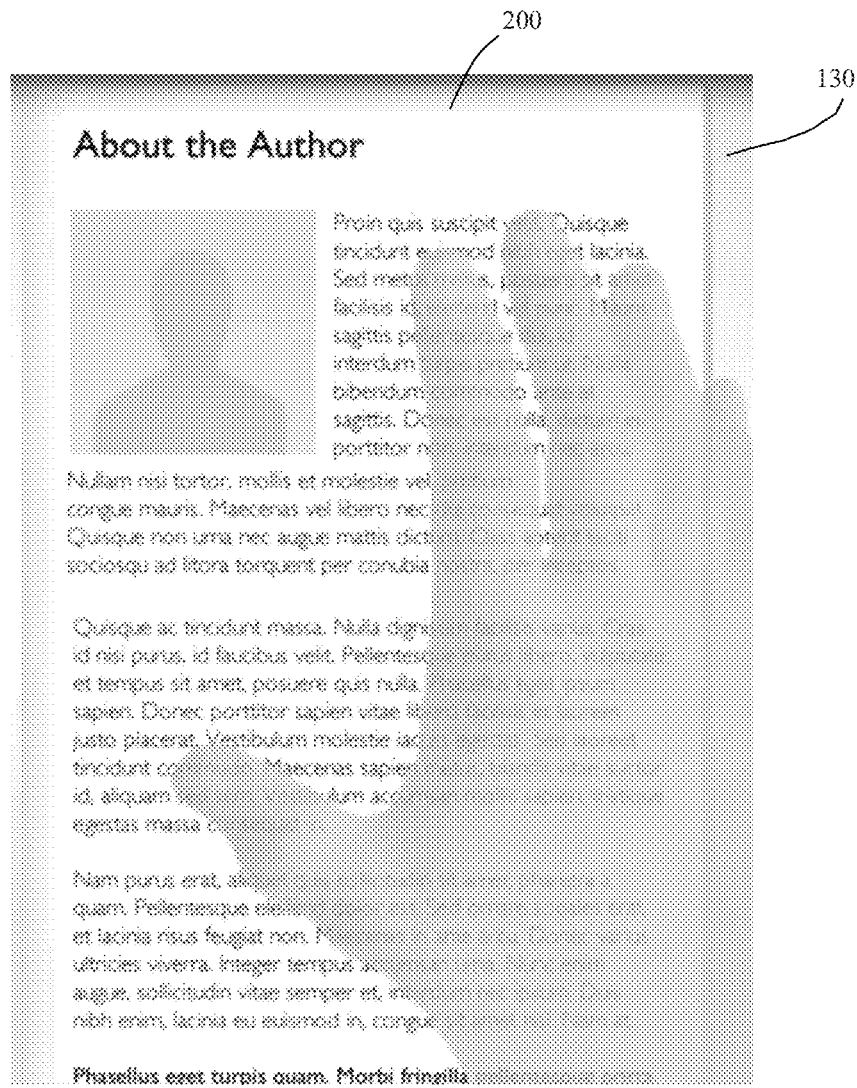
FIG. 1 illustrates an exemplary page in an electronic document as a user is performing a "squeeze" gesture on the page.

FIG. 1 illustrates a user viewing a page 200 of an electronic book on her electronic device 130. As shown h FIG. 1, the page 200 basically fills the entire screen of the device 130, plus or minus space for a status bar or some tool icons. User interfaces of electronic readers 130 are typically constructed this way to provide the maximum amount of text on the screen and to give the user the impression that she is reading a physical book.

As used herein, a "user" may be a single user or a group of users. As used herein, the term "user" (or "user device", "client device", "network-connected device" or "device") can refer to any electronic apparatus configured for receiving control input and configured to send commands or data either interactively or automatically to other devices. As used herein, the term "method" refers to one or more steps performed at least by one electronic or computer-based apparatus. Steps may be performed in any order without departing from the scope of the invention.

FIG. 1 further illustrates the user touching three (or four or five) fingers on the screen of the device 130 that is displaying the page 200 and performing a squeezing gesture, like crumpling a piece of paper. The device 130 detects this gesture and interprets it as a command to reduce the size of the displayed page 200 and reveal the additional content and tools. Likewise, the user may perform an unsqueeze gesture. The device 130 detects this unsqueeze gesture and interprets it as a command to enlarge the size of the displayed page 200 and hide the additional content and tools Alternative embodiments can support a two-finger squeeze gesture in contexts where a two-finger pinch gesture is not already devoted to another function such as zooming Certain applications use two-finger pinch for zooming in and out, so a preferred embodiment uses three-or-more-finger-squeeze for the "reveal more information" gestures of the present invention. However designers may choose to allow two finger squeeze.

Figure 2:
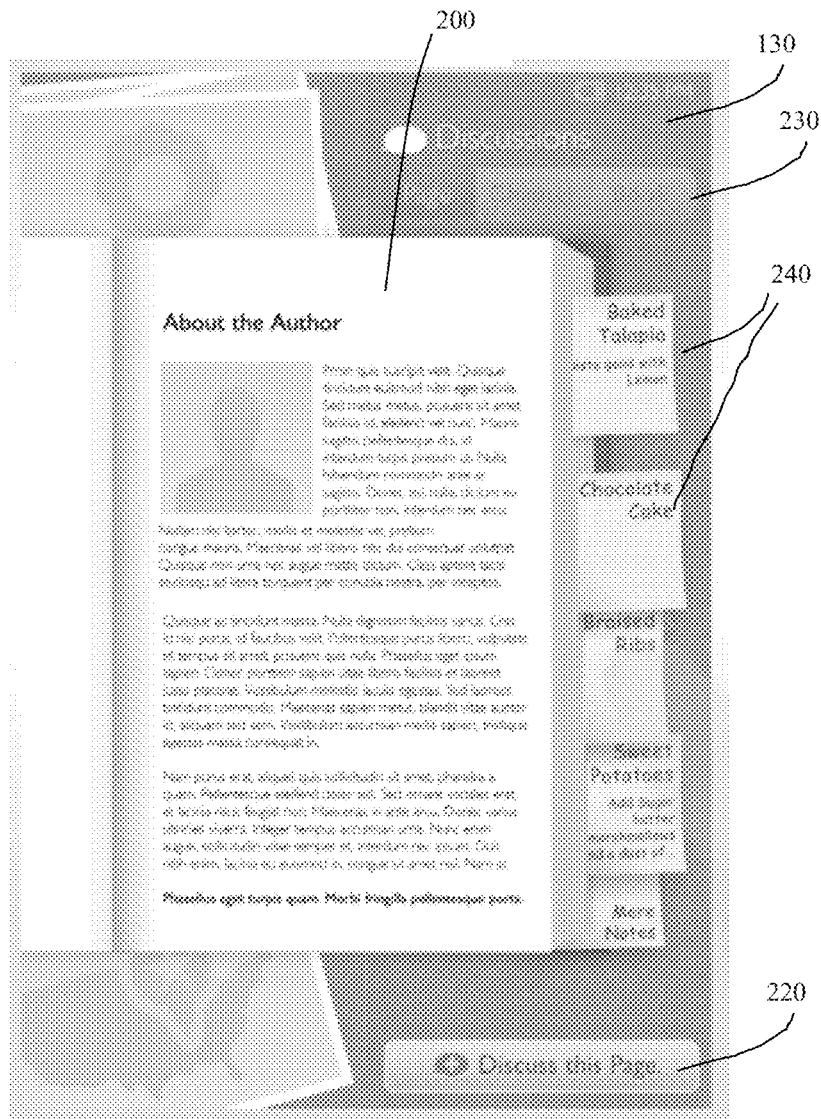
FIG. 2 illustrates an exemplary reduced size page, revealing additional content and functions associated with the page or the electronic publication.

As shown in FIG. 2, in response to the user's squeezing gesture on the touch screen, the system shrinks the page 200 of the electronic publication on all sides (insetting) and thereby reveal additional content or tools 220, 230, 240 associated with the page 200 or the electronic publication. These could be tools or panels for doing things such as adding a note, marking a page with a "sticky" note 240, sharing the book or a quote within the page 200, starting, joining or reading discussions related to this book or related to the current page 200.

As appreciated by those skilled in the art, the types of features, tools, content applications revealed by the squeeze gesture of the present invention is only limited by the functions available on the reader 130. The discussion and sticky note features described above are merely exemplary. While the present disclosure discusses a few specific features, such as sticky notes 240, the squeeze gesture of the present invention can clearly reveal a wide variety of alternative features in addition to the ones described herein.

Pages 200 preferably remain active when displayed in a shrunken state. The user can flip them and read the next pages, for example. Some reading tools may be disabled while the page 200 is in its shrunken state.

Figure 3:
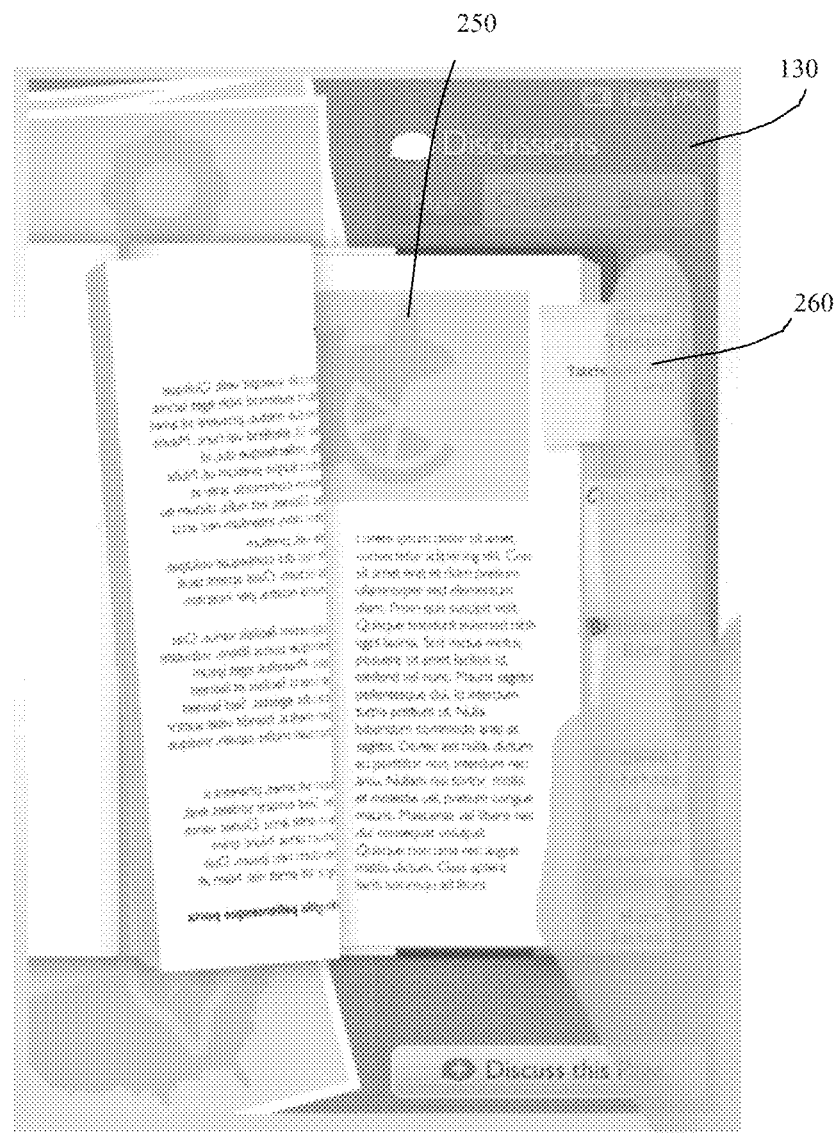
FIG. 3 illustrates a user selecting a note that was previously associated with the page or the electronic publication.

FIG. 3 illustrates a user selecting a specific sticky note 260 that was previously applied on a page 250 of the electronic publication. As the user taps on the sticky note 260, the system turns the pages of the electronic publication until the specific page 250 on which the sticky note 260 was applied is revealed.

Figure 4:
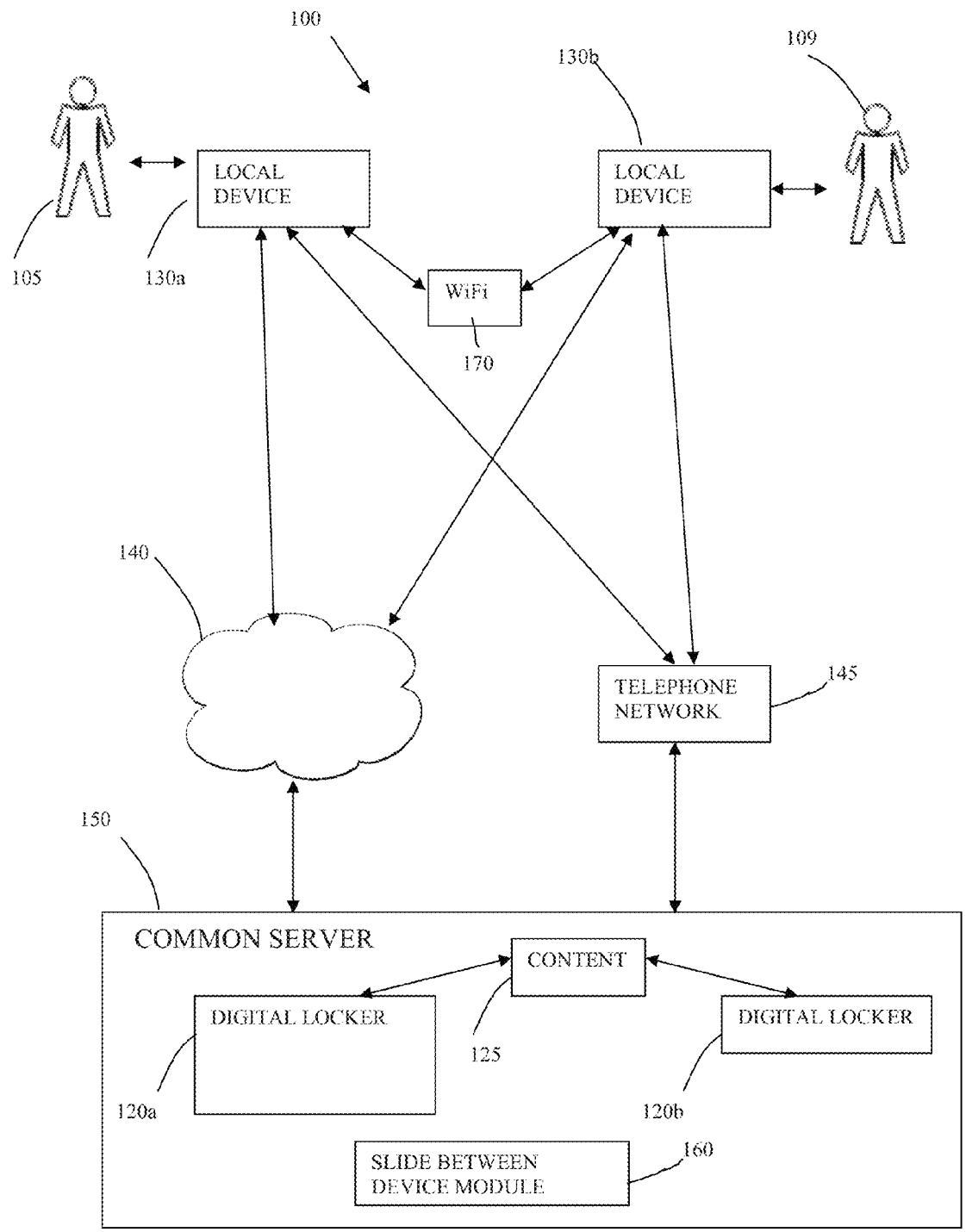
FIG. 4 illustrates an exemplary system according to the present invention.

FIG. 4 shows components of a system according to the present invention. User 105 is an authorized user of system 100 and uses her local device 130a for the reading of digital content and interacting with other users, such as user 109.

Many of the functions of system 100 of the present invention are carried out on server 150. As appreciated by those skilled in the art, many of the functions described herein can be divided between the server 150 and the user's local devices 130a, 130b. Further, as also appreciated by those skilled in the art, server 150 can be considered a "cloud" with respect to the users and their local devices 130a, 130b. The cloud 150 can actually be comprised of several servers performing interconnected and distributed functions. For the sake of simplicity in the present discussion, only a single server 150 will be described. The user 105 can connect to the server 150 via the Internet 140, a telephone network 145 (e.g., wirelessly through a cellphone network) or other suitable electronic communication means. User 105 has an account on server 150, which authorizes user 105 to use system 100.

Associated with the user's 105 account is the user's 105 digital locker 120a located on the server 150. As further described below, in the preferred embodiment of the present invention, digital locker 120a contains links to copies of digital content 125 previously purchased (or otherwise legally acquired) by user 105.

Indicia of rights to all copies of digital content 125 owned by user 105, including digital content 125, is stored by reference in digital locker 120a. Digital locker 120a is a remote online repository that is uniquely associated with the user's 105 account. As appreciated by those skilled in the art, the actual copies of the digital content 125 are not necessarily stored in the user's locker 120a, but rather the locker 120a stores an indication of the rights of the user to the particular content 125 and a link or other reference to the actual digital content 125. Typically, the actual copy of the digital content 125 is stored in another mass storage (not shown). The digital lockers 120 of all of the users 105, 109 who have purchased a copy of a particular digital content 125 would point to this copy in mass storage. Of course, back up copies of all digital content 125 are maintained for disaster recovery purposes. Although only one example of digital content 125 is illustrated in this Figure, it is appreciated that the lending server 150 can contain millions of files 125 containing digital content. It is also contemplated that the server 150 can actually be comprised of several servers with access to a plurality of storage devices containing digital content 125. As further appreciated by those skilled in the art, in conventional licensing programs, the user does not own the actual copy of the digital content, but has a license to use it. Hereinafter, if reference is made to "owning" the digital content, it is understood what is meant is the license or right to use the content.

Also contained in the user's digital locker 120a is her contacts list. In a preferred embodiment, the user's contact list will also indicate if the contact is also an authorized (registered) user of the system 100 with his or her own account on server 150. This information can be used by some of the additional tools revealed when a page is in a shrunken state as described above.

User 105 can access his or her digital locker 120a using a local device 130a. Local device 130a is an electronic device such as a personal computer, an e-book reader, a smart phone or other electronic device that the user 105 can use to access the server 150. In a preferred embodiment, the local device has been previously associated or registered, with the user's 105 account using user's 105 account credentials. Local device 130a provides the capability for user 105 to download user's 105 copy of digital content 125 via his or her digital locker 120a. After digital content 125 is downloaded to local device 130a, user 105 can engage with the downloaded content locally, e.g., read the book, listen to the music or watch the video.

In a preferred embodiment, local device 130a includes a non-browser based device interface that allows user 105 to initiate the discussion functionality of elements 220, 230 (FIG. 2), in a non-browser environment. Through the device interface, the user 105 is automatically connected to the server 150 in a non-browser based environment. This connection to the server 150 is a secure interface and can he through the telephone network 145, typically a cellular network for mobile devices. If user 105 is accessing his or her digital locker 120a using the Internet 140, local device 130a also includes a web account interface. Web account interface provides user 105 with browser-based access to his or her account and digital locker 120a over the Internet 140.

User 109 is also an authorized user of system 100. As with user 105, user 109 has an account with lending server 150, which authorizes user 109 to use lending system 100. As appreciated by those skilled in the art, the number of users 105, 109 that employ the present invention at the same time is only limited by the scalability of server 150. As with user 105, user 109 can access his or her digital locker 120b using her local device 130b. In a preferred embodiment, local device 130b is a device that user 109 has previously associated, registered, with his or her account using user's 109 account credentials. Local device 130b allows user 109 to download copies of his digital content 125 from digital locker 1 Mb. User 109 can engage with downloaded digital content 125 locally on local device 130b.

Figure 5:
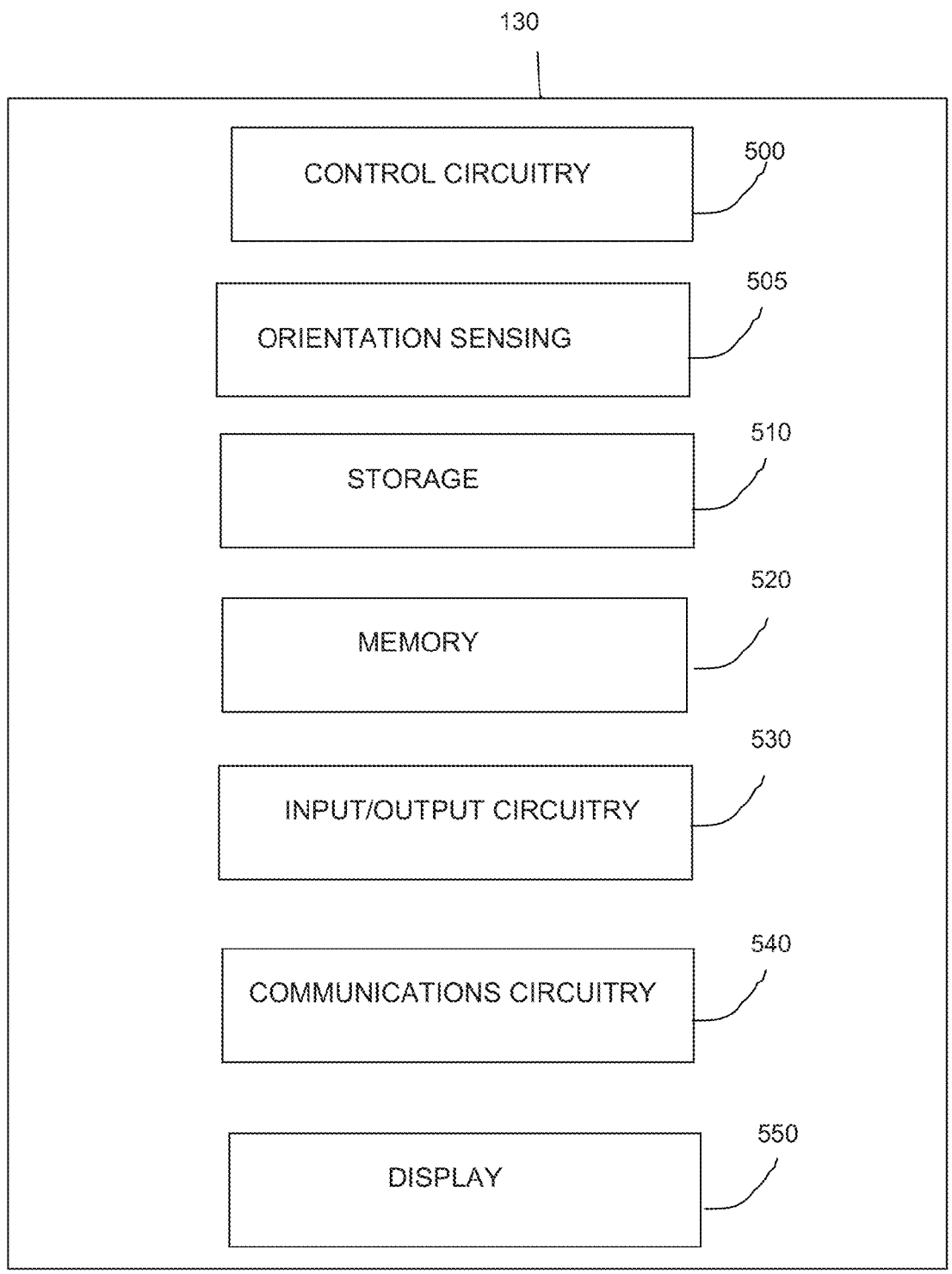
FIG. 5 illustrates the components of an exemplary device.

FIG. 5 illustrates an exemplary local device 130. As appreciated by those skilled the art, the local device 130 can take many forms capable of operating the present invention. As previously described, in a preferred embodiment the local device 130 is a mobile electronic device, and in an even more preferred embodiment device 130 is an electronic reader device. Electronic device 130 can include control circuitry 500, storage 510, memory 520, input/output ("I/O") circuitry 530, communications circuitry 540, and display 550. In some embodiments, one or more of the components of electronic device 130 can be combined or omitted, e.g., storage 510 and memory 520 may be combined. As appreciated by those skilled in the art, electronic device 130 can include other components not combined or included in those shown in this Figure, e.g., a power supply such as a battery, an input mechanism, etc.

Electronic device 130 can include any suitable type of electronic device. For example, electronic device 130 can include a portable electronic device that the user may hold in his or her hand, such as a digital media player, a personal e-mail device, a personal data assistant ("PDA"), a cellular telephone, a handheld gaming device, a tablet device or an eBook reader. As another example, electronic device 130 can include a larger portable electronic device, such as a laptop computer. As yet another example, electronic device 130 can include a substantially fixed electronic device, such as a desktop computer.

Control circuitry 500 can include any processing circuitry or processor operative to control the operations and performance of electronic device 130. For example, control circuitry 500 can be used to run operating system applications, firmware applications, media playback applications, media editing applications, or any other application. Control circuitry 500 can drive the display 550 and process inputs received from a user interface, e.g., the display 550 if it is a touch screen.

Orientation sensing component 505 includes orientation hardware such as, but not limited to, an accelerometer or a gyroscopic device and the software operable to communicate the sensed orientation to the control circuitry 500. The orientation sensing component 505 is coupled to control circuitry 500 that controls the various input and output to and from the other various components. The orientation sensing component 505 is configured to sense the current orientation of the portable mobile device 130 as a whole. The orientation data is then fed to the control circuitry 500 which control an orientation sensing application. The orientation sensing application controls the graphical user interface (GM), which drives the display 550 to present the GUI for the desired mode.

Storage 510 can include, for example, one or more computer readable storage mediums including a hard-drive, solid state drive, flash memory, permanent memory such as ROM, magnetic, optical, semiconductor, paper, or any other suitable type of storage component, or any combination thereof. Storage 510 can store, for example, media content, e.g., eBooks, music and video files, application data, e.g., software for implementing functions on electronic device 130, firmware, user preference information data, e.g., content preferences, authentication information, e.g., libraries of data associated with authorized users, transaction information data, e.g., information such as credit card information, wireless connection information data, e.g., information that can enable electronic device 130 to establish a wireless connection, subscription information data, e.g., information that keeps track of podcasts or television shows or other media a user subscribes to, contact information data, e.g., telephone numbers and email addresses, calendar information data, and any other suitable data or any combination thereof. The instructions for implementing the functions of the present invention may, as non-limiting examples, comprise software and/or scripts stored in the computer-readable media 510

Memory 520 can include cache memory, semi-permanent memory such as RAM, and/or one or more different types of memory used for temporarily storing data. In some embodiments, memory 520 can also be used for storing data used to operate electronic device applications, or any other type of data that can be stored in storage 510. In some embodiments, memory 520 and storage 510 can be combined as a single storage medium.

I/O circuitry 530 can be operative to convert, and encode/decode, if necessary analog signals and other signals into digital data. In some embodiments, I/O circuitry 530 can also convert digital data into any other type of signal, and vice-versa. For example, I/O circuitry 530 can receive and convert physical contact inputs, e.g., from a multi-touch screen, i.e., display 550, physical movements, e.g., from a mouse or sensor, analog audio signals, e.g., from a microphone, or any other input. The digital data can be provided to and received from control circuitry 500, storage 510, and memory 520, or any other component of electronic device 130. Although I/O circuitry 530 is illustrated in FIG. 5 as a single component of electronic device 130, several instances of I/O circuitry 530 can be included in electronic device 130.

Electronic device 130 can include any suitable interface or component for allowing a user to provide inputs to I/O circuitry 530. For example, electronic device 130 can include any suitable input mechanism, such as a button, a keyboard/keypad, a dial, a click wheel, a haptic feedback device, a motion feedback device, a voice recognition device, a microphone, a speaker, a touchpad or a touch screen, and similar and complementary devices that enable operative response to user commands that are received at a computing device (e.g., display 550). In some embodiments, electronic device 130 can include a capacitive sensing mechanism, or a multi-touch capacitive sensing mechanism.

In some embodiments, electronic device 130 can include specialized output circuitry associated with output devices such as, for example, one or more audio outputs. The audio output can include one or more speakers, e.g., mono or stereo speakers, built into electronic device 130, or an audio component that is remotely coupled to electronic device 130, e.g., a headset, headphones or earbuds that can be coupled to device 130 with a wire or wirelessly.

Display 550 includes the display and display circuitry for providing a display visible to the user. For example, the display circuitry can include a screen, e.g., an LCD screen, that is incorporated in electronics device 130. In some embodiments, the display circuitry can include a coder/decoder (Codec) to convert digital media data into analog signals. For example, the display circuitry or other appropriate circuitry within electronic device can include video Codecs, audio Codecs, or any other suitable type of Codec.

The display circuitry also can include display driver circuitry, circuitry for driving display drivers, or both. The display circuitry can be operative to display content, e.g., media playback information, application screens for applications implemented on the electronic device 130, information regarding ongoing communications operations, information regarding incoming communications requests, or device operation screens, under the direction of control circuitry 500. Alternatively, the display circuitry can be operative to provide instructions to a remote display.

Communications circuitry 540 can include any suitable communications circuitry operative to connect to a communications network and to transmit communications, e.g., data from electronic device 130 to other devices within the communications network. Communications circuitry 540 can be operative to interface with the communications network using any suitable communications protocol such as, for example, Wi-Fi, e.g., a 802.11 protocol, Bluetooth, radio frequency systems, e.g., 900 MHz, 1.4 GHz, and 5.6 GHz communication systems, infrared, GSM, GSM plus EDGE, CDMA, quadband, and other cellular protocols, VOIP, or any other suitable protocol.

Electronic device 130 can include one more instances of communications circuitry 540 for simultaneously performing several communications operations using different communications networks, although only one is shown in FIG. 5 to avoid overcomplicating the drawing. For example, electronic device 130 can include a first instance of communications circuitry 540 for communicating over a cellular network, and a second instance of communications circuitry 540 for communicating over Wi-Fi or using Bluetooth. In some embodiments, the same instance of communications circuitry 540 can be operative to provide for communications over several communications networks.

In some embodiments, electronic device 130 can be coupled to a host device such as digital content control server 150 for data transfers, synching the communications device, software or firmware updates, providing performance information to a remote source, e,g., providing riding characteristics to a remote server, or performing any other suitable operation that can require electronic device 130 to be coupled to a host device. Several electronic devices 130 can be coupled to a single host device using the host device as a server. Alternatively or additionally, electronic device 130 can be coupled to several host devices, e.g., for each of the plurality of the host devices to serve as a backup for data stored in electronic device 130.

For the sake of brevity, it should be understood that certain structures and functionality, or aspects thereof, of embodiments of the presently disclosed invention that are evident from the illustrations of the figures have not been necessarily restated herein, Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A method for controlling display of content on an electronic device having an input surface and sensors for detecting at least touch input, the method comprising:
   displaying one or more pages of the content on a display screen of the electronic device so that the content fills substantially an entire display area of the display screen;
   detecting a squeeze gesture at a location on the content displayed on the display screen;
   in response to detecting the squeeze gesture, reducing the one or more pages to reveal additional content and features associated with the one or more pages, wherein the additional content and features include at least one of an interface for accessing a social network platform for sharing the content, and an interface for accessing one or more discussion forums for the content;
   after reducing, displaying the one or more pages of the content on the display screen so that the content fills less than the entire display area of the display screen;
   providing a digital locker that contains one or more of links to copies of previously purchased digital content, indicia of rights to all copies of the previously purchased digital content and at least one contacts list associated with at least one user; and
   providing a platform, the platform including:
      a network interface for performing at least one of:
         accessing digital content over a network;
         facilitating registration of at least one user with at least one content provider; and
         authenticating access by one or more registered users to the digital content; and
      an engine configured to:
         associate the digital locker with at least one of a user and one or more contacts from the contacts list; and
         verify a user's rights to the previously purchased digital content.

2. The method of claim 1, further comprising performing the squeeze gesture by touching at least two fingers on the one or more pages to be reduced.

3. The method of claim 1, further comprising performing the squeeze gesture by touching at least three fingers on the one or more pages to be reduced.

4. The method of claim 1, wherein the additional content and features further include at least one of a virtual notepad and a virtual sticky note.

5. The method of claim 4 further comprising detecting a tap gesture at a location on the additional content and features displayed on the display screen; and
   in response to detecting the tap gesture, turning the one or more pages until a specific page corresponding to the tapped additional content and features is revealed on the display screen.

6. The method of claim 1, wherein the one or more pages remain active after the reducing thereof.

7. A system for controlling display of content on an electronic device having an input surface and sensors for detecting at least touch input, the system comprising:
   a display screen on which one or more pages of content is displayed;
   a memory that includes instructions for, in response to detecting a squeeze gesture at a location on the content displayed on the display screen, reducing the content to reveal additional content and features associated with the one or more pages, wherein the additional content and features include at least one of an interface for accessing a social network platform for sharing the content, and an interface for accessing one or more discussion forums for the content;
   control circuitry coupled to the memory and coupled to the display screen, the control circuitry capable of executing the instructions and is operable to at least:
   display the one or more pages of the content on the display screen of the electronic device so that the content fills an entire display area of the display screen;
   detect the squeeze gesture;
   reduce the content in response to detecting the squeeze gesture; and
   after reducing, display the one or more pages of the content on the display screen so that the content fills less than the entire display area of the display screen;
   a digital locker that contains one or more of links to copies of previously purchased digital content, indicia of rights to all copies of the previously purchased digital content and at least one contacts list associated with at least one user; and
   a platform including:
      a network interface for performing at least one of:
         accessing content over a network;
         facilitating registration of at least one user with at least one content provider; and
         authenticating access by one or more registered users to digital content provided by at least one content provider; and
      an engine configured to:
         associate at least one of a user and one or more contacts from a contact list with a corresponding digital locker;
         verify a user's rights to the previously purchased digital content; and
         reveal additional content and features associated with the one or more pages upon detecting the squeeze gesture.

8. The system of claim 7, wherein the control circuitry executing the instructions is further operable to at least:
   detect the squeeze gesture when effected by a user touching at least two fingers on the display screen and performing a squeezing gesture.

9. The system of claim 7, wherein the control circuitry executing the instructions is further operable to at least:
   detect the squeeze gesture when effected by a user touching at least three fingers on the display screen and performing a squeezing gesture.

10. The system of claim 7, wherein the additional content and features further include at least one of a virtual notepad and a virtual sticky note.

11. The system of claim 10, wherein the control circuitry executing the instructions is further operable to:
   detect a tap gesture at a location on the additional content and features displayed on the display screen; and
   in response to detecting the tap gesture, turn the one or more pages until a specific page corresponding to the tapped additional content and features is revealed on the display screen.

12. The system of claim 7, wherein the one or more pages remain active after the reducing thereof.

13. The system of claim 7, wherein the electronic device includes an electronic reader and the content includes an electronic publication, and the instructions further cause the electronic device to format the electronic publication to reveal the additional content and features upon detecting the squeeze gesture.

14. A non-transitory computer-readable medium comprising a plurality of instructions that, when executed by at least one electronic device, at least cause the at least one electronic device to:
   display one or more pages of the content on a display screen of the electronic device so that the content fills an entire display area of the display screen;
   detect a squeeze gesture at a location on the content displayed on the display screen;
   in response to detecting the squeeze gesture, reduce the one or more pages to reveal additional content and features associated with the one or more pages, wherein the additional content and features include at least one of an interface for accessing a social network platform for sharing the content, and an interface for accessing one or more discussion forums for the content;
   after reducing, display the one or more pages of the content on the display screen so that the content fills less than the entire display area of the display screen; and
   access a digital locker that contains one or more of links to copies of previously purchased digital content, indicia of rights to all copies of the previously purchased digital content and at least one contacts list associated with at least one user, the digital locker being accessed through a platform including:
      a network interface for performing at least one of:
         accessing content over a network;
         facilitating registration of at least one user with at least one content provider; and
         authenticating access by one or more registered users to digital content provided by at least one content provider; and
      an engine configured to:
         associate at least one of a user and one or more contacts from a contact list with a corresponding digital locker;
         verify a user's rights to the previously purchased digital content; and
         reveal additional content and features associated with the one or more pages upon detecting the squeeze gesture.

15. The non-transitory computer-readable medium of claim 14, wherein the instructions further cause the at least one electronic device to:
   detect the squeeze gesture when effected by a user touching at least two fingers on the display screen and performing a squeezing gesture.

16. The non-transitory computer-readable medium of claim 14, wherein the additional content and features include at least one of a virtual notepad and a virtual sticky note.

17. The non-transitory computer-readable medium of claim 16, wherein the instructions further cause the at least one electronic device to:
   detect a tap gesture at a location on the additional content and features displayed on the display screen; and
   in response to detecting the tap gesture, turn the one or more pages until a specific page corresponding to the tapped additional content and features is revealed on the display screen.

* * * * *